(12) United States Patent
Wiklof et al.

(10) Patent No.: US 6,618,162 B1
(45) Date of Patent: Sep. 9, 2003

(54) APPARATUS AND METHOD TO CONFIGURE A DEVICE, SUCH AS A PRINTER, OVER A NETWORK

(75) Inventors: Christopher A. Wiklof, Everett, WA (US); Pixie Ann Austin, Marysville, WA (US); Mike T. Brooks, Bend, OR (US); Jaye A. Jarchow, Snohomish, WA (US)

(73) Assignee: Intermec IP Corp., Beverly Hills, CA (US)

( * ) Notice: Subject to any disclaimer, the term of this patent is extended or adjusted under 35 U.S.C. 154(b) by 0 days.

(21) Appl. No.: 09/237,625

(22) Filed: Jan. 26, 1999

(51) Int. Cl.[7] .............................. G06F 15/00; G06K 1/00
(52) U.S. Cl. ..................... 358/1.15; 358/1.15; 358/1.16; 710/10; 710/1; 710/2; 710/3; 710/4
(58) Field of Search ............................... 358/1.15, 1.18, 358/1.13; 709/2; 710/1–10

(56) References Cited

U.S. PATENT DOCUMENTS

| | | | |
|---|---|---|---|
| 5,453,933 A | | 9/1995 | Wright et al. ........... 364/474.23 |
| 5,497,450 A | * | 3/1996 | Helmbold et al. ........... 395/114 |
| 5,602,742 A | | 2/1997 | Solondz et al. ........... 364/464.2 |
| 5,613,160 A | | 3/1997 | Kraslavsky et al. |
| 5,623,604 A | | 4/1997 | Russell et al. ........... 395/200.1 |
| 5,640,002 A | | 6/1997 | Ruppert et al. |
| 5,673,385 A | * | 9/1997 | Mack et al. ............. 395/183.2 |
| 5,943,503 A | * | 8/1999 | Kai ............................. 395/839 |
| 6,195,171 B1 | * | 2/2001 | Ochiai ....................... 358/1.15 |
| 6,335,795 B1 | * | 1/2002 | Neuhard et al. ........... 358/1.15 |

FOREIGN PATENT DOCUMENTS

EP 0 809 176 A2 11/1997

* cited by examiner

Primary Examiner—Edward Coles
Assistant Examiner—Saeid Ebrahimi
(74) Attorney, Agent, or Firm—Seed IP Law Group PLLC

(57) ABSTRACT

A device such as a printer, includes non-volatile memory storing a communications kernel. Upon startup, a microprocessor executes the communication kernel to prompt a host to download a setup kernel to the device. The microprocessor may verify the downloading using a check sum calculation. The microprocessor may execute the setup kernel to determine the operational characteristics on the device. For example, the microprocessor may interrogate the hardware elements of the device to determine a set of hardware characteristics. The microprocessor may also interrogate the device to determine a set of user selectable setup options and may further interrogate the device or a nonresident register for ownership and access attributes for selected modules and software. The microprocessor may link a number of resident and non-resident library modules, selected based on the operational characteristics. The library modules are dynamically linkable to reconfigure the software as operational characteristics change. The invention employs a dual kernel system, including a minimal communications kernel and a setup kernel to customize the device.

63 Claims, 9 Drawing Sheets

APPARATUS AND METHOD TO CONFIGURE A DEVICE, SUCH AS A PRINTER, OVER A NETWORK

TECHNICAL FIELD

This invention relates to dedicated devices having a processor that executes a set of instructions, and more particularly to the loading of the instructions for the processor.

BACKGROUND OF THE INVENTION

Many devices employ a processor executing instructions contained in embedded code. A small sampling of such devices include printers, copying machines, video cassette recorders ("VCR"), thermostats, and a variety of systems in automobiles such as the ignition system. Traditionally, these dedicated devices store their instruction sets in a fixed form in a non-volatile memory, such as read-only memory ("ROM"). More recently, these dedicated devices have taken advantage of reprogrammable non-volatile memories, such as erasable programmable memory ("EPROM"), electronically erasable PROM ("EEPROM"), and flash RAM to store the instruction sets. Programmable memories allow the dedicated device to be reprogrammed without the expense and inconvenience of replacing a ROM or motherboard.

Dedicated devices typically have the complete instruction set for running the device stored in the non-volatile memory. Such an approach has a number of distinct drawbacks. For instance, storing the executable code for anything but the most simple device requires a significant amount of non-volatile memory. The dedicated device may not be upgradable or may be difficult to upgrade, requiring the entire instruction set to be reprogrammed. Such an upgrade may take a considerable period of time and may lead to corrupted executable code rendering the device permanently inoperative. This is particularly a problem when the size of the program is considerable. Additionally, the user of a dedicated device my not be aware of a significant upgrade and may be running old, incompatible or corrupted programs.

SUMMARY OF THE INVENTION

Under one aspect of the invention, a dedicated device such as a printer may have a small amount of non-volatile memory to store a communications kernel. Upon startup, a microprocessor in the dedicated device executes the communication kernel to prompt a host, such as a server, to download a setup kernel to a memory in the dedicated device. The microprocessor may determine a checksum value for return to the host to verify that the setup kernel was correctly received. Upon verification of the setup kernel, the microprocessor may execute the instructions of the setup kernel to determine a set of operational characteristics of the dedicated device. For example, the microprocessor may interrogate the hardware elements of the dedicated device to determine a set of hardware characteristics. The microprocessor may also interrogate the dedicated device to determine the value of a set of user selectable setup options. The microprocessor may further interrogate the dedicated device or a nonresident register for ownership attributes to, for example, determine ownership and access rights to selected modules and software.

Upon determining the operational characteristics, the microprocessor may select a number of library modules based on the operational characteristics and link the library modules to create an operational program for the device. The microprocessor may download some, none, or all of the library modules and may link both resident and nonresident library modules.

The resulting device is specifically configured to take advantage of all of the hardware components contained in the device and to run the most recent versions of software. The device is further configured to operate in accordance with all user selected options and to allow access to any functionality that the user has a right to access.

For example, in the case of a printer, appropriate library modules may be linked to match the hardware characteristics of the printer, such as the printhead and the transport mechanism. The linked libraries may also match user selectable setup options, such as page size, duplex or nonduplex printing, and darkness or contrast. Further, in the case of a printer, selected modules may be linked to provide access to certain fonts or print drivers that the user has purchased or licensed.

In a further aspect of the invention, the library modules are dynamically linkable to reconfigure the software as the operational characteristics change. For example, the user of the dedicated device may vary the user selectable setup options or may pay a fee to access a particular piece of code such as a particular font.

Thus, the device employs a dual kernel system, employing a minimal communications kernel stored in non-volatile memory to download a setup kernel that determines the operating characteristics and selectives or links library modules based on the determined characteristics. Each dedicated device can be customized to provide the precise functionality that the user requires. The resulting dedicated device is easily upgradable and permits easy and efficient testing and debugging. Such testing and debugging may take place over a network, such as the Internet.

DETAILED DESCRIPTION OF THE INVENTION

In the following description, certain specific details are set forth in order to provide a thorough understanding of various embodiments of the invention. However, one skilled in the art will understand that the invention may be practiced without these details. In other instances, well known structures associated with microprocessors, computing systems, and printers have not been shown or described in detail to avoid unnecessarily obscuring the description of the embodiments of the invention. Further, while the description is given in terms of an exemplary printer, one skilled in the art will recognize that the teachings herein may be applied to other dedicated devices employing a processor executing an instruction set.

Figure 1:
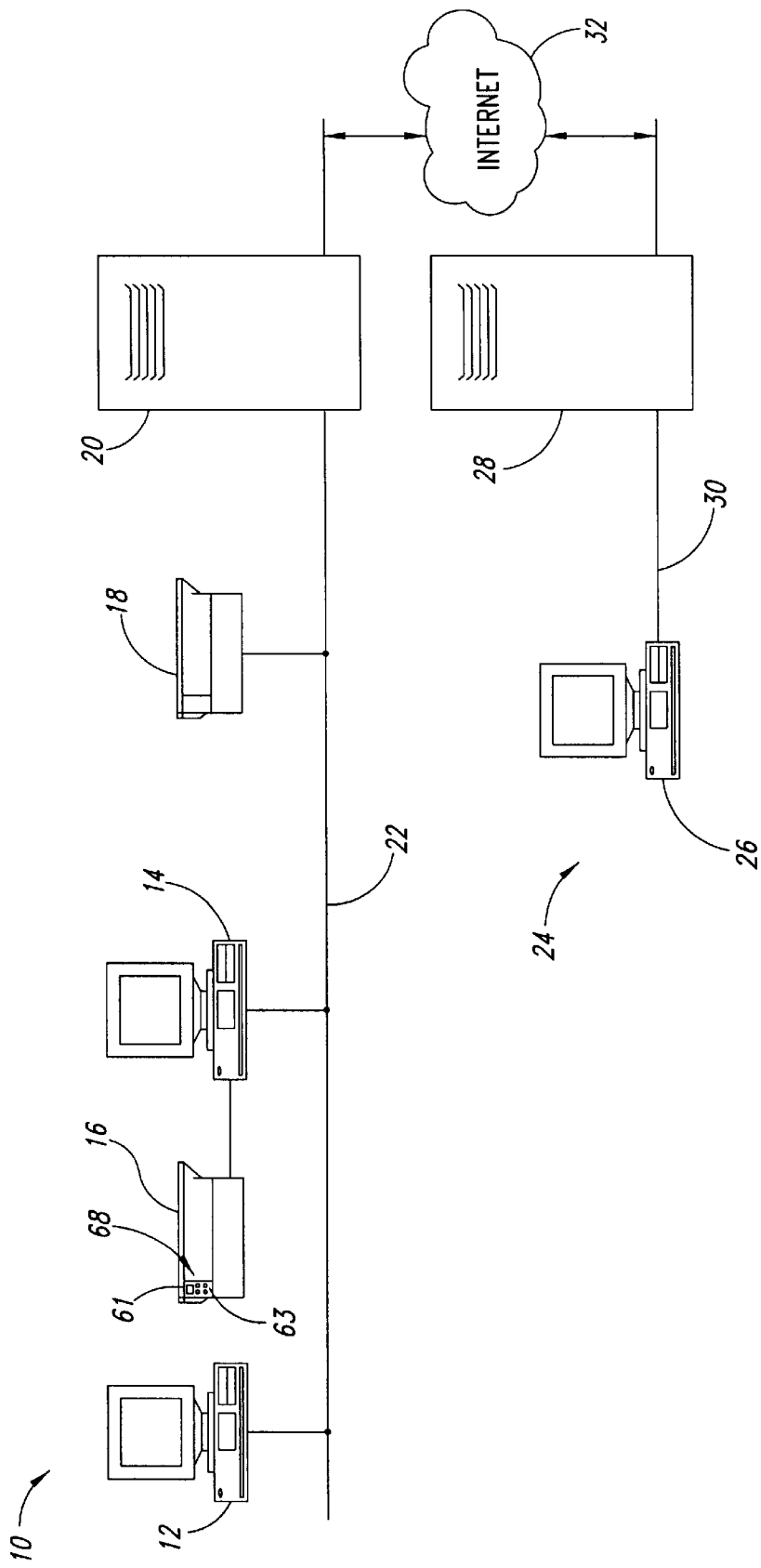
FIG. 1 is a block diagram of a local area network.

FIG. 1 shows a first local area network ("LAN") 10 including first and second personal computers 12, 14, and a first printer 16 coupled to the second personal computer 14. A second printer 18, a server 20, and the first and second personal computers 12, 14 are each coupled to a LAN bus 22, and all include an appropriate LAN interface (not shown), for example, Ethernet interfaces 10Base-2, 10Base-T, or 10Base-5, with a coax connector, RJ45 connector, or a DB15 connector. The server 20 may serve as a library for files to be transmitted and processed on the LAN 10. The server 20 may further provide access to a network external from the LAN 10 such as a wide area network ("WAN"), the Internet or World Wide Web, for example.

FIG. 1 further shows a second LAN 24 including a personal computer 26 and a second server 28 coupled through a LAN bus 30. The second LAN 24 may be distant from the first LAN 10, for example, at a vendor's manufacturing or support facility for the printers 16, 18. A network 32 such as the Internet may couple the first server 20 and the second server 28 providing a communications channel therebetween.

Figure 2:
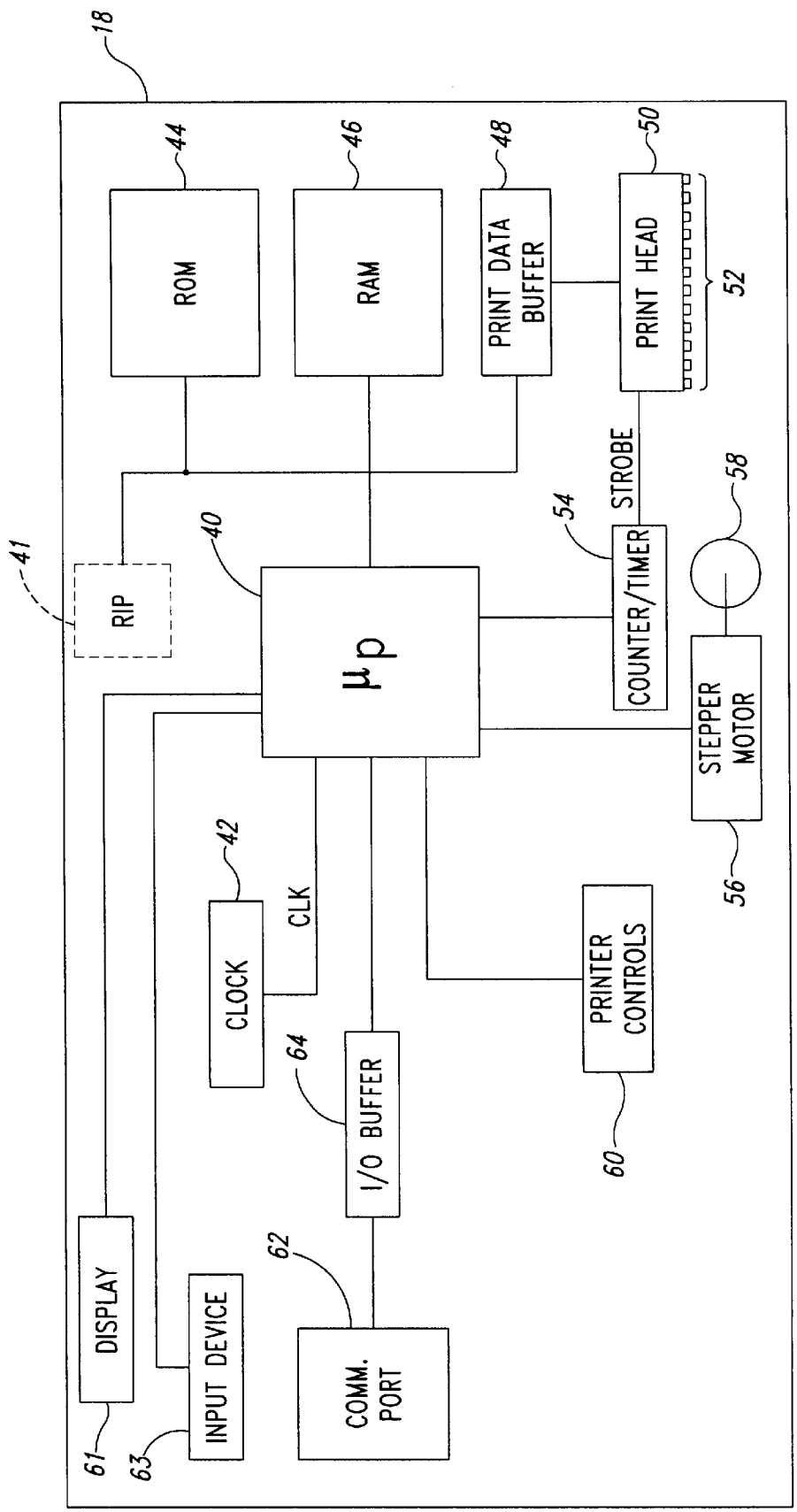
FIG. 2 is a functional block diagram of a printer on the local area network of FIG. 1.

Referring to FIG. 2, the printer 18 includes a microprocessor 40 for executing executable instructions and controlling the various components of the printer 18. The microprocessor 40 receives a clock signal CLK from an oscillator or clock 42. Data and address busses couple the microprocessor 40 to a read-only memory ("ROM") 44, a random access memory ("RAM") 46, and a print data buffer 48. The ROM 44 is a non-volatile memory having sufficient space to store a communications kernel. The ROM 44 may take the form of an "EPROM," "EEPROM," or a flash memory to permit the communications kernel to be upgraded. A kernal is the level of an operating system or networking system that contains the system-level commands, or the functions hidden from the user, such as device drivers, memory management routines, and system calls. The communications kernal is a minimum set of system-level set of commands required to control a communications port.

The RAM 46 may take the form of volatile memory such as dynamic RAM. The RAM 46 should contain sufficient memory to store at least a portion of the instruction set for controlling the printer 18. A portion of the RAM 16 may form the print data buffer 48. Alternatively, the print data buffer 48 may be formed separately from the RAM 46. The print data buffer 48 should be sufficiently large to buffer print data to a printhead 50.

While the printhead 50 will be discussed in terms of a thermal printhead, other suitable printheads include laser printheads, impact printheads, and inkjet printheads. The thermal printhead 50 includes a linear array of thermal elements 52 that may be selectively heated by the application of electric signals corresponding to the data in the print data buffer 48 and a strobe signal from a counter or timer 54 as is generally known in the art. The microprocessor 40 controls the counter or timer 54 to synchronize the strobe signal with the print data buffer 48.

The microprocessor 40 further controls a stepper motor 56 and a platen roller 58. For each signal from the microprocessor 40 to the stepper motor 56, the stepper motor advances the platen roller 58 a given increment for advancing a print media such as paper past the printhead 50.

The printer 18 may optionally include a raster image processor 41 to convert vector graphics as text into a bit-mapped image. Alternatively, the microprocessor 40 may perform the conversion functions.

The printer 18 includes a set of printer controls 60 allowing a user to set a number of printer parameters. The printer controls 60 may take the form of a set of switches on the printer 18 accessible by the user. Additionally, or alternatively, the printer controls 60 may take the form of user-selectable icons in a graphical user interface ("GUI") on a display 61 of the printer 18 or on a personal computer 14 associated with a printer 16 (FIG. 1). The printer may also have user input device such as a keyboard, keypad, or touch sensitive screen 63.

The printer 18 further includes a communications port 62 for providing communications between the printer 18 and a network 22 or an associated personal computer 12, 14 (FIG. 1). The communications port 62 may take the form of a serial or parallel connector coupled to the microprocessor 40. Communications port 62 is preferably coupled to the microprocessor 40 through an input/output buffer ("I/O buffer") 64. The I/O buffer 64 buffers I/O data to permit the microprocessor 40 time to adequately process the I/O data.

Figure 3:
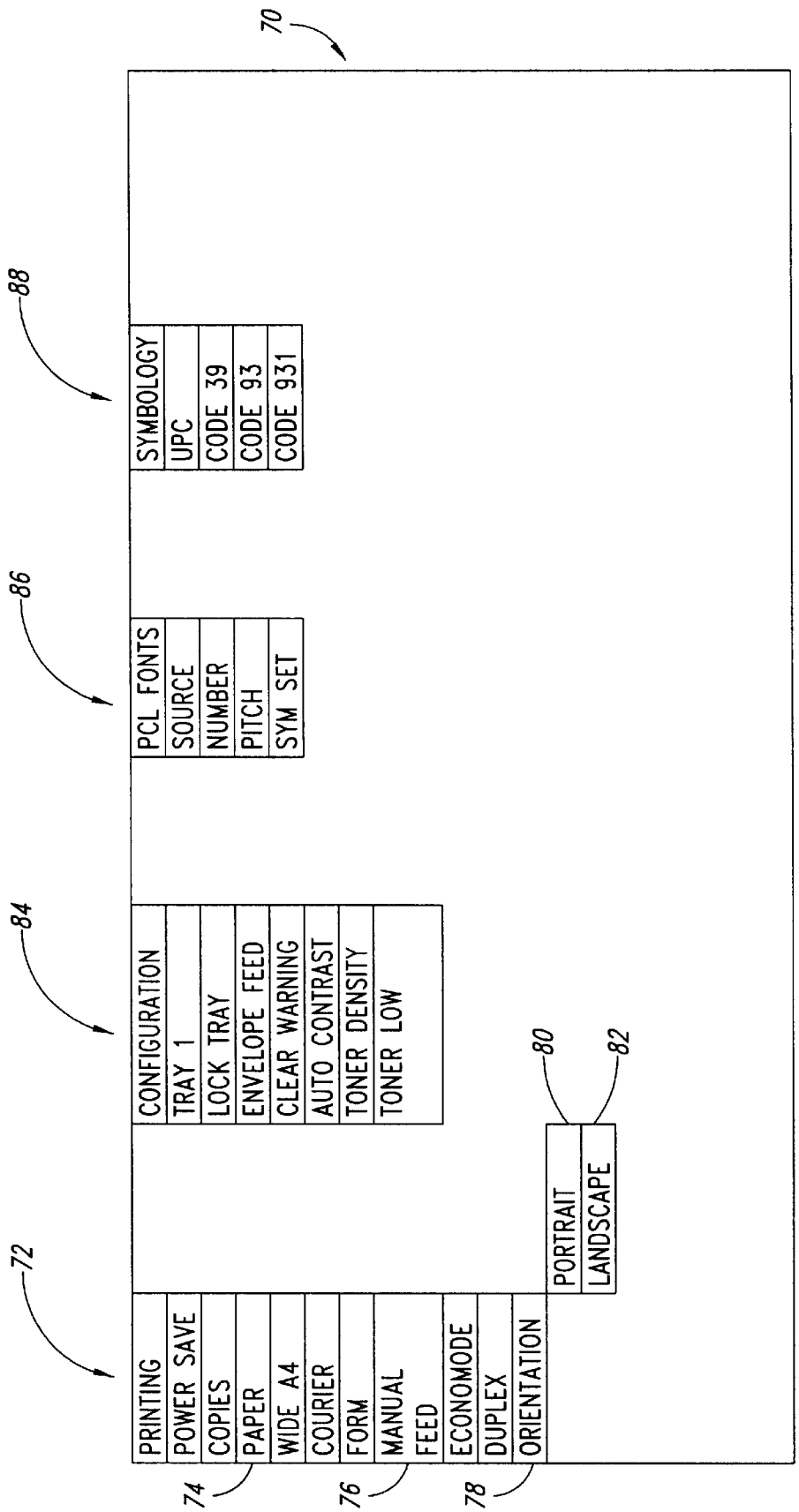
FIG. 3 is a diagram of an exemplary graphical user interface for display on a display screen of the printer of FIG. 2.

Referring to FIG. 3, a graphical user interface 70 for display on the display 61 of the printer 18 presents a variety of user selectable setup options. The GUI 70 includes a printing menu 72 having a number of printing options such as paper selection 74, manual feed selection 76, and page orientation 78. Many of the selectable icons may include additional pull-down menus, for example, the page orientation icon includes portrait and landscape icons 80, 82 for selecting portrait and landscape page orientations, respectively. Similarly, the GUI 70 includes menus to configure the printer 84, set the PCL fonts 86, and select a symbology 88, such as a bar code symbology.

In one embodiment, the GUI 70 may be implemented as a configuration homepage transmitted to the display 61 from the printer manufacturer or vendor's website over the World Wide Web (WWW). Thus, the manufacturer or vendor may easily upgrade the software on any or all of the devices it has sold, as well as collect data regarding the actual use of the devices. Pages may be transmitted using standard TCP/IP.

An exemplary method of operation will be discussed with principal reference to a routine 100 shown in FIG. 4 and secondary reference to FIGS. 1 and 2. The printer 18 may be started in step 102 for example, by activating an on/off switch to cause the printer 18 to power up (step 104). The microprocessor 40 employs a small, minimized set of executable instructions or kernel stored in the ROM 44 to initialize the RAM 46 in step 106 and to set communications parameters for the communications port 62 in step 108.

At some time before or during this process, a host such as the server 28 is started in step 112. The printer 18 sends a wakeup sequence to the server 28 in step 110 and pauses in step 114. In step 116, the server 28 receives the wakeup sequence. In response to a wakeup sequence, the server 28 downloads to the Internet 32 a predefined set of instructions (e.g., executable code) to the printer 18 over the second LAN 24 in the step 118. In step 120, the printer 18 receives the predefined set of executable instructions at the communications port 62 over the first LAN 10 and stores the set of executable instructions in the RAM 46 (FIG. 2).

In step 122, the microprocessor 40 calculates a checksum based on the value of the bits downloaded in step 120. In step 124, the microprocessor 40 reports the checksum to the server 28. After reporting the checksum, the printer 18 pauses at step 114 while the server 28, in step 126, verifies the checksum value against the value corresponding to the executable instructions downloaded in step 118. If the checksum value does not verify, the server 28 issues a clear memory command to the printer 18 in step 130. If the checksum does verify, the server 28 ends its initialization routine in step 132. The printer 18 thus now has a set of executable instructions loaded in RAM 46. The executable instructions may represent any recent upgrades as stored in the server 28. This may prove particularly convenient where, for example, the printer manufacturer or vendor operates the server 28 and continually upgrades the server 28 to include the most recent set of software, including any bug fixes or revisions, new fonts and styles including new machine readable symbologies such a bar code symbology fonts.

While the above operation was described in terms of the printer 18 as the dedicated device and the server 28 as the host, a similar operation could apply using the server 20 as the host, or using the printer 16 as the device and either the personal computer 14, the server 20, or the server 28 as the host.

Figure 4:
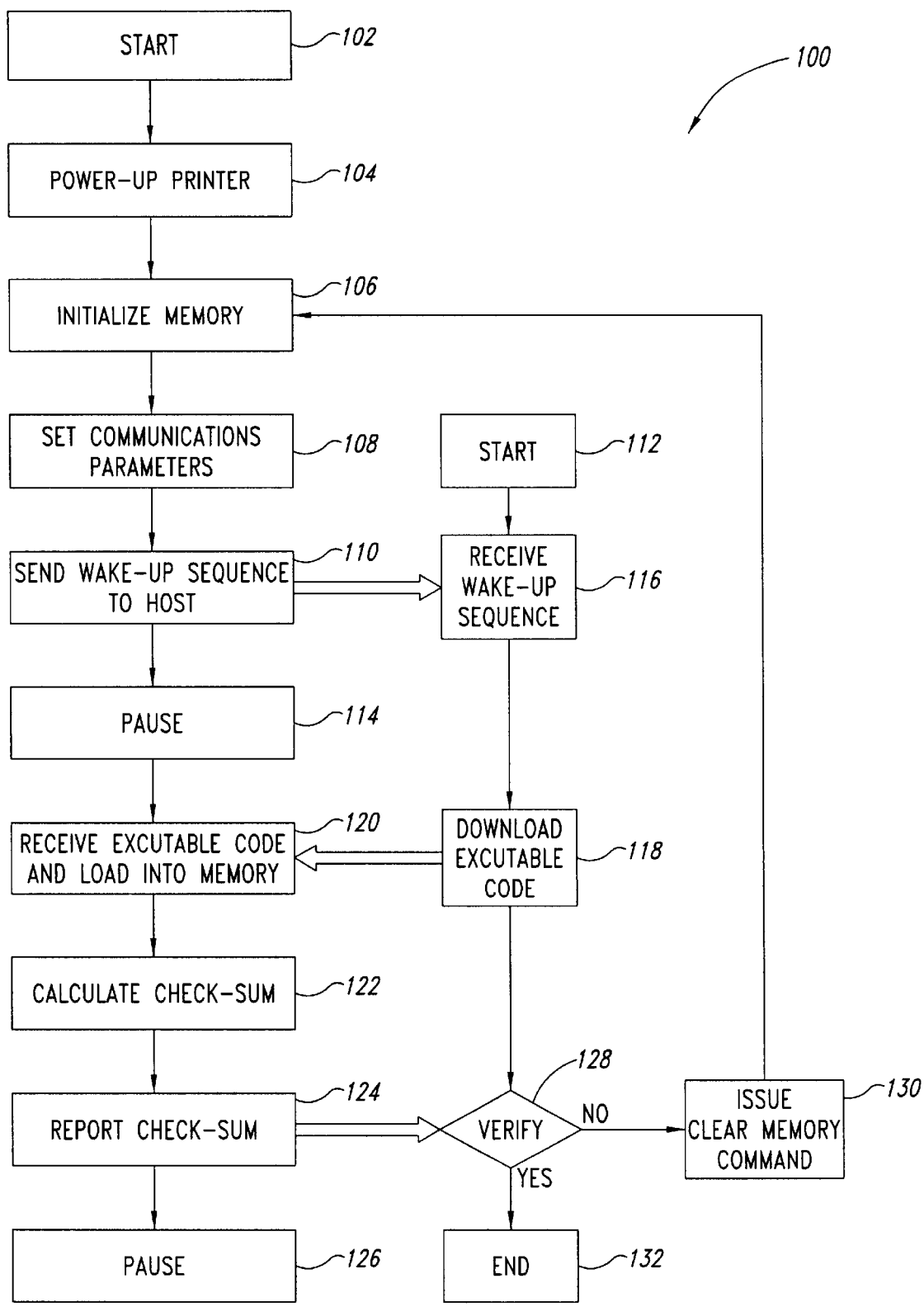
FIG. 4 is a flowchart showing the sequence of operations by a microprocessor in the printer and a host to which the printer is attached, the host downloading executable code to the printer in response to a wake-up signal from a communications kernal in the printer.
Figure 5:
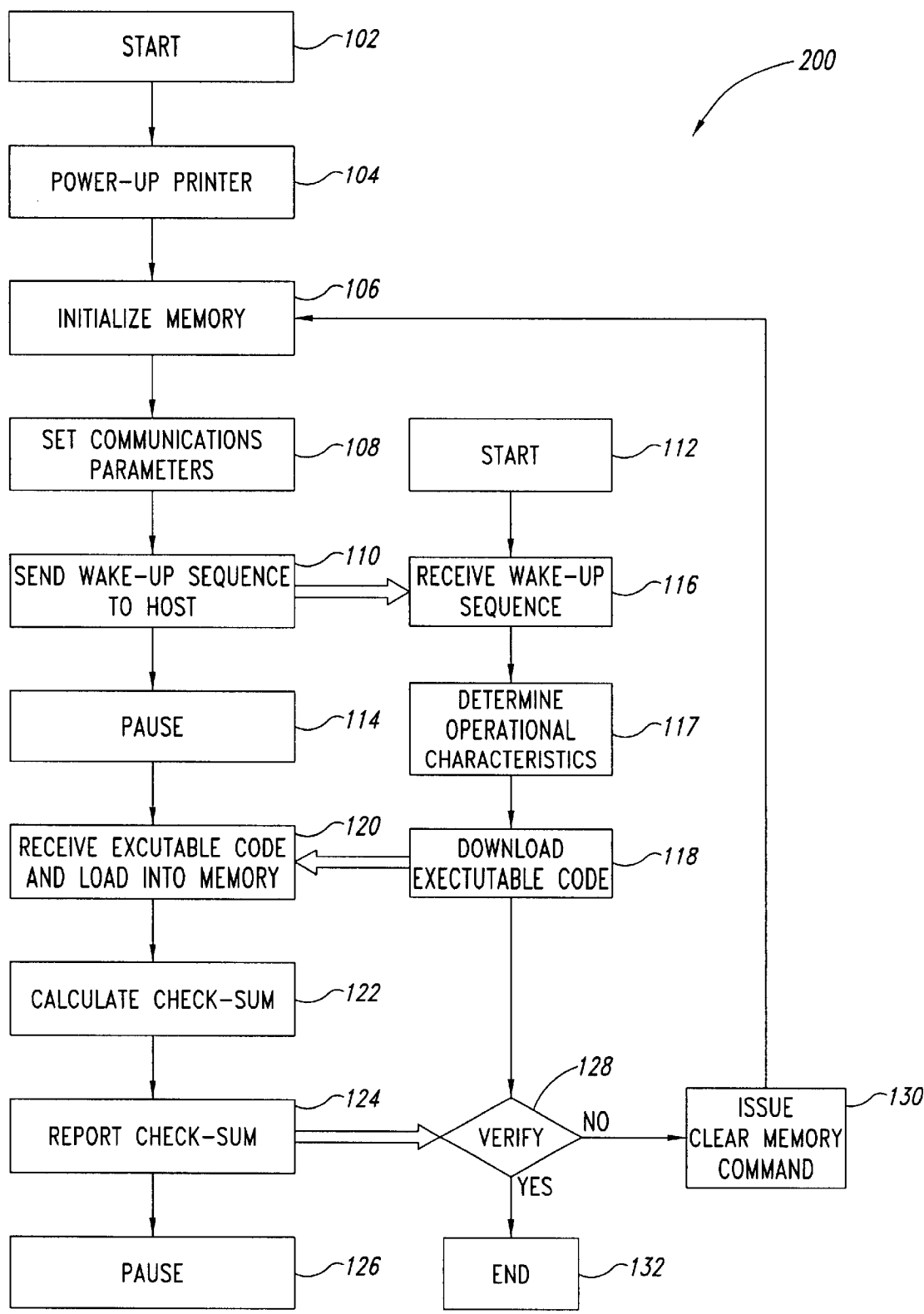
FIG. 5 is a flowchart of an alternative sequence of operations of the microprocessor in the printer and the host to which the printer is attached, the host determining operational characteristics of the printer in response to a wake-up signal from the communications kernal in the printer prior to downloading executable code.

As shown in FIG. 5, an alternative embodiment of the present invention employs a routine 200 that includes steps similar to routine 100 of FIG. 4. This alternative embodiment, and those described herein, are substantially similar to previously described embodiments, and common steps and structures are identified by the same reference numbers. Only significant differences in operation or structure are described in detail.

Referring to FIG. 5, in step 117 a host such as the server 28 determines the operational characteristics of a device, such as the printer 18 prior to downloading suitable executable code. The server 28 may determine the operational characteristics in a variety of fashions. For example, the host may examine a number of user selectable setup options, such as page size, duplex printing, paper tray, or contrast. These options may be set by a user using a set of dedicated switches, for example on a control panel 68 of the printer 18. The options may be entered by the user in response to a series of queries by the printer 18 or associated personal computer 12, 14 at the initiative of the host, for example during start up or before each print job. The query may be in the form of a series of dialog boxes on the display 61. The options may also be set through a menu of options available for selection on the display 61 as part of a graphical user interface ("GUI").

Alternatively, the host may examine hardware characteristics itself, without user involvement. For example, the server 28 may interrogate the printer 18 to determine the printer hardware characteristics such as printhead type, transport mechanism, and print engine type. In such a case, each hardware component in the printer 18 is assigned a hardware type identifier that is made available on the printer's 18 data bus, identifying, for example, the type of hardware, the manufacturer and the model of the hardware component. The host may determine many of the operational characteristics using this information to access a lookup table. Where a lookup table is not convenient, the hardware components of the printer 18 may each make their own operational characteristics available on the data bus. The server 28 may alternatively, or additionally, examine the boot history of the printer 18, determining which hardware components of the printer 18 were successfully booted up.

Further, the host may examine ownership parameters for various hardware components and software elements for use in the printer 18. For example, the server 28 may identify a set of fonts available to the printer 18 by way of a paid-up license. Such information may be stored in the printer 18, or externally from the printer 18, for example at the vendor support facility. Similarly, the host may select an appropriate print driver based on the printer hardware characteristics and the most recent printer updates. Thus, the server 28 may automatically upgrade the printer software each time the printer 18 is started, providing the most recent software for the given hardware configuration in step 118.

This may be particularly advantageous where individual hardware components of the printer are made available for upgrading the capabilities of the printer 18. For example, this may permit a user to replace a relatively low resolution printhead (300 dpi) with a higher resolution printhead (600 dpi). The host, server 20, 28 would then provide the appropriate driver software for the higher resolution printhead, thereby significantly upgrading the performance of the printer 18 without the need to purchase an entire new printer. Thus, modularity in hardware design would provide significant benefits in conjunction with modular software design. For example, this might permit a number of vendors to supply a variety of hardware components that could be easily swapped into and out of the device.

Figure 6A:
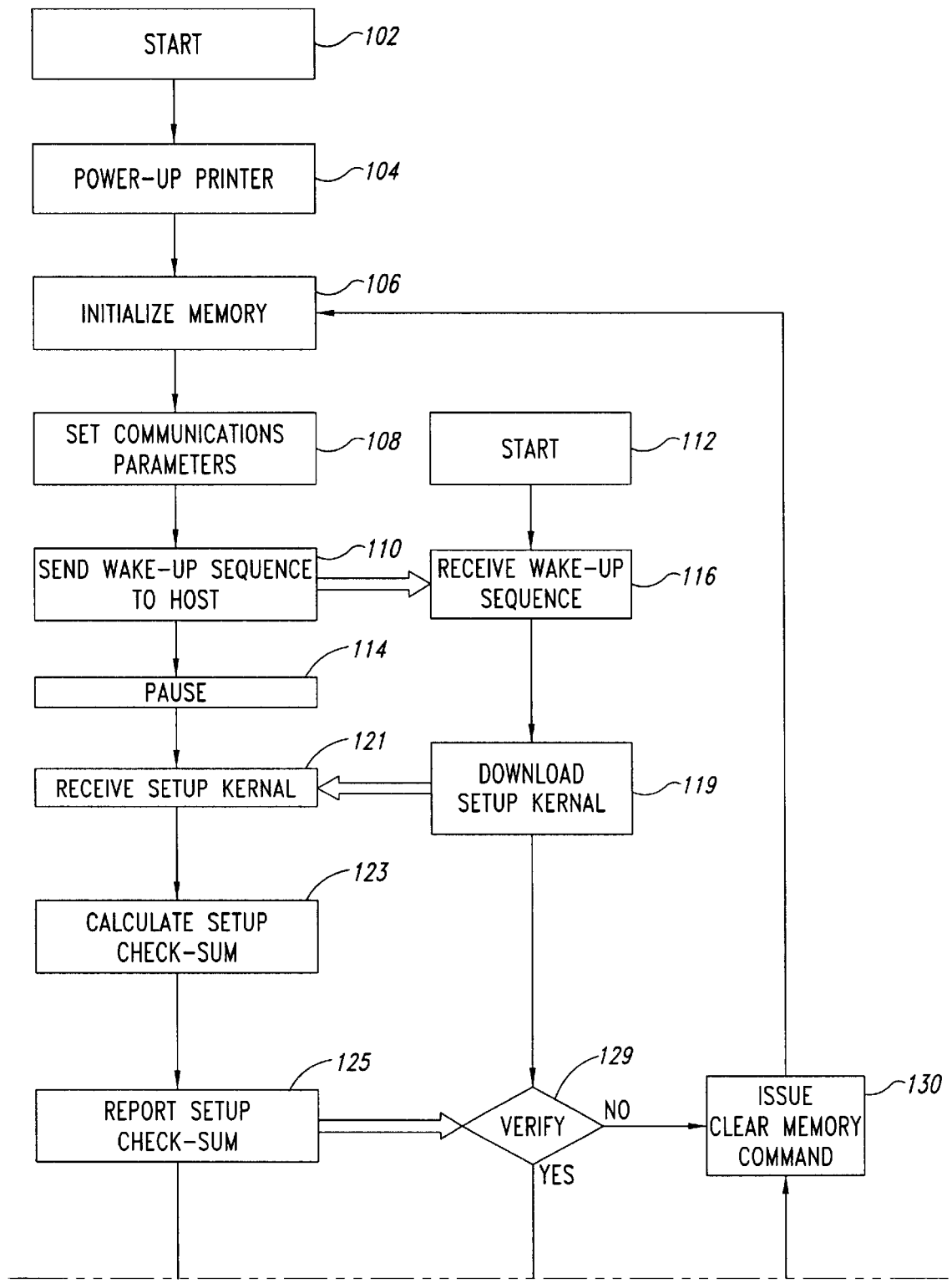
FIGS. 6A and 6B show a flow chart of another alternative sequence of operations of the microprocessor in the printer and the host to which the printer is attached, the host downloading a setup kernal to the printer to determine the operational characteristics.
Figure 6B:
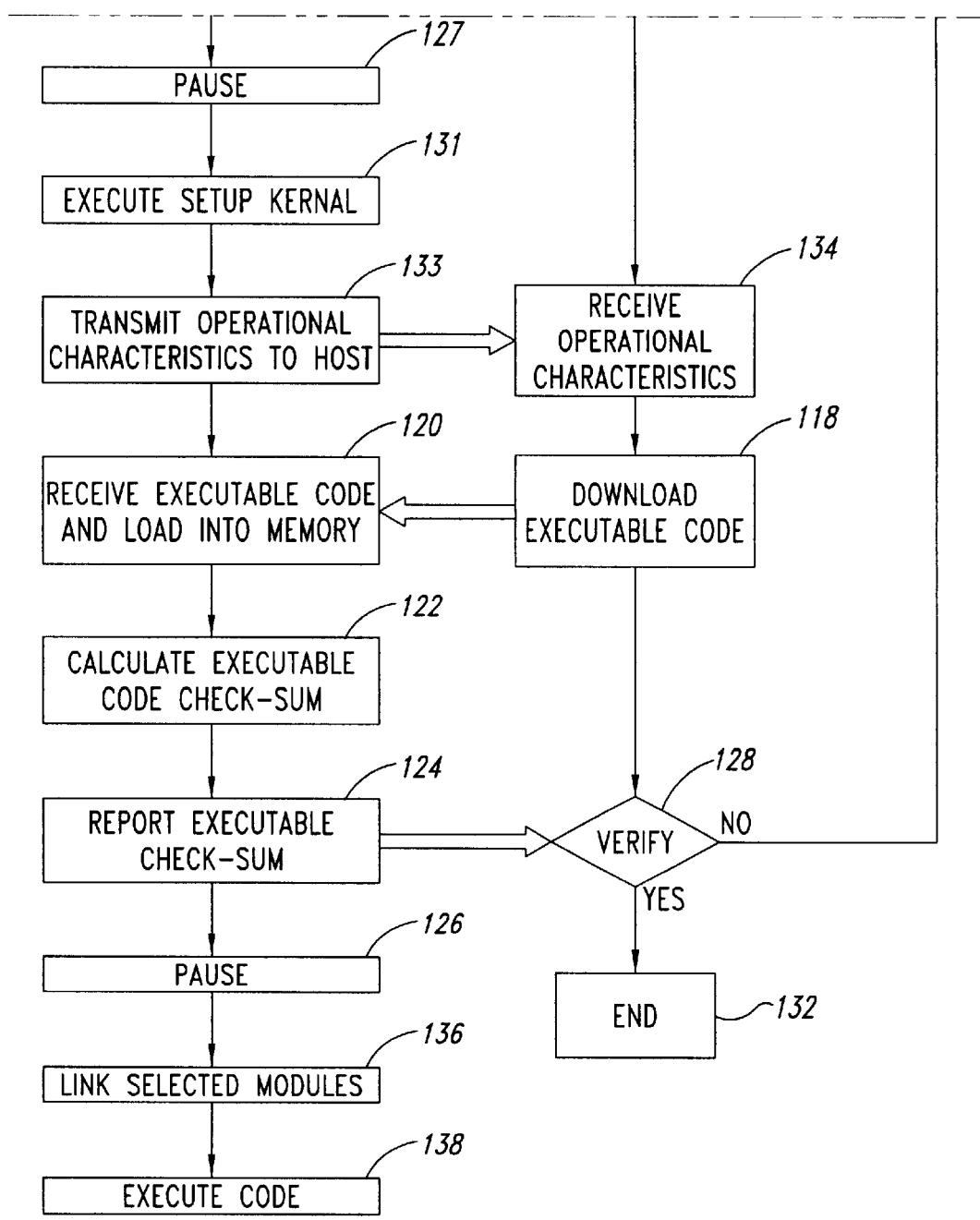

FIG. 6 shows another alternative embodiment of operation including a setup kernel of executable instructions downloaded to printer 18 by a host, such as the server 28, to determine the operational characteristics of the printer 18. Upon receiving the wakeup sequence in step 116, the server 28 downloads the setup kernel in step 119 to the printer 18. In step 121, the printer 18 receives the setup kernel. The printer 18 may calculate a setup checksum in step 123 and report the setup checksum in step 125 to the host, server 28. The printer 18 pauses in step 127 after reporting the setup checksum.

In step 127, the server 28 verifies the setup checkup sum by comparing the checksum to the setup kernel that was downloaded to the printer 18 in step 119. If the checksum does not verify, the server 28 issues a clear memory command in step 130. If the setup checksum verifies, the microprocessor 40 executes the setup kernel in step 131 to obtain the operational characteristics of the printer 18. In step 133, the microprocessor 40 transmits the operational characteristics to the server 28.

In step 134, the server 28 receives the operational characteristics from the printer 18. Based on the operational characteristics, the server 28, in step 118, downloads selected modules of executable code to the printer 18. In step 120, the printer 18 receives the selected modules and loads the executable instructions into the RAM 46. In steps 122–128, a checksum verification is performed to verify the download. The microprocessor 40 links selected library modules (in step 136) to form the executable instruction set for running the printer 18. Linking comprises producing an executable program from one or more modules, such as programs, routines or libraries. The library modules may be dynamically linkable libraries ("DLL"), to permit "on-thefly" reconfiguration. In step 138, the microprocessor 40 executes the linked library modules to run the printer 18.

The teachings of U.S. patent application U.S. Ser. No. 09/240,108, filed Jan. 29, 1999, entitled "REMOTE ANOMALY DIAGNOSIS AND RECONFIGURATION OF AN AUTOMATIC DATA COLLECTION DEVICE PLATFORM OVER A TELECOMMUNICATIONS NETWORK"; and provisional application U.S. Serial No. 60/084,272, filed May 4, 1998, 1999, entitled "AUTOMATIC DATA COLLECTION DEVICE HAVING A NETWORK COMMUNICATIONS CAPABILITY" are incorporated herein by reference.

Figure 7:
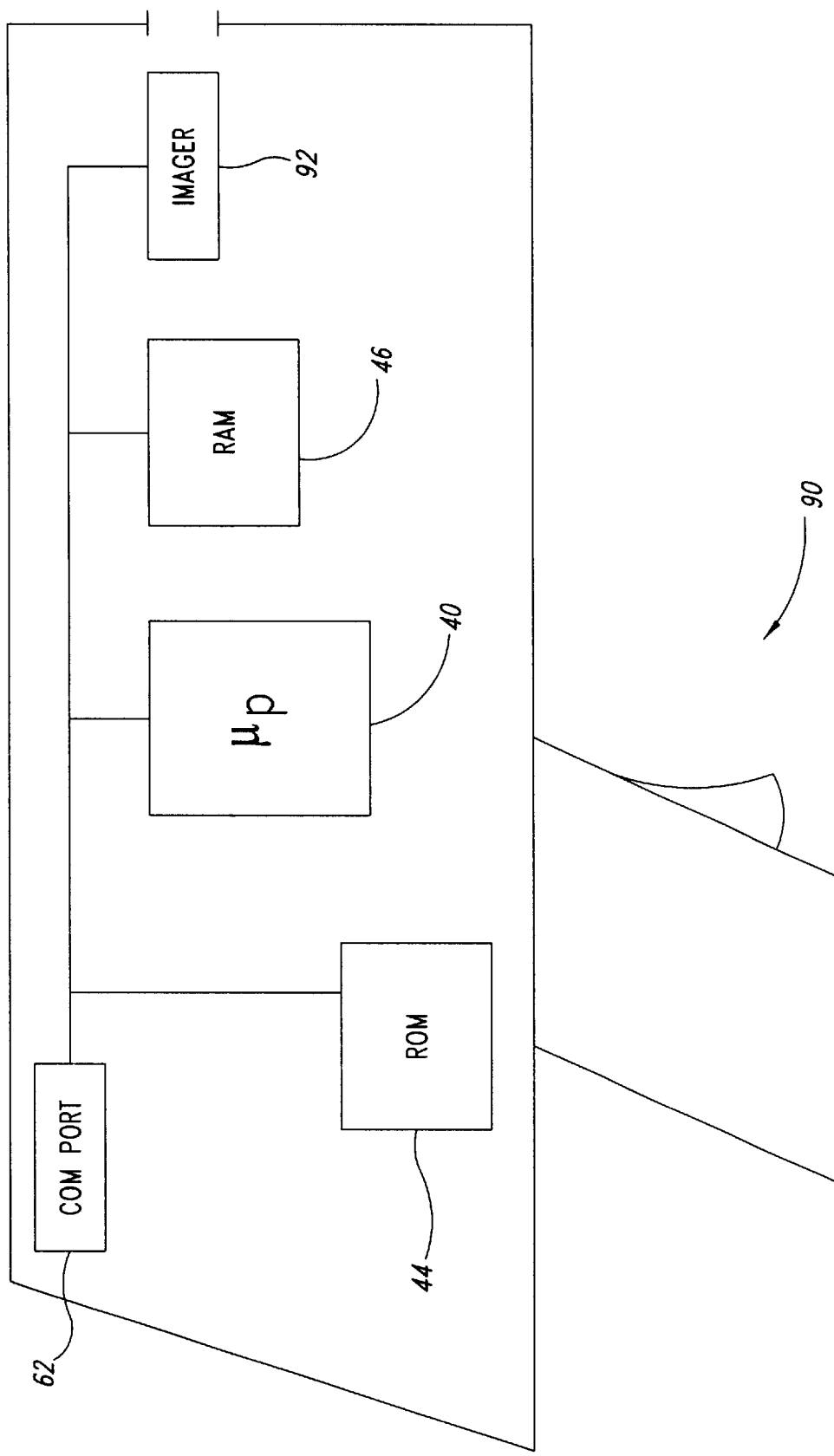
FIG. 7 is a functional block diagram of an automatic data collection ("ADC") device in the form of a symbol reader, such as a bar code reader.

With reference to FIG. 7, an automatic data collection ("ADC") device platform having a bar code reader 90 adeptly accesses and retrieves data stored in the form of a bar code label. Data representing virtually any product or service found in the marketplace may be encoded in a bar code label for later access by an ADC device platform having a bar code reader 90. For these reasons, ADC device platforms are now actively used for planning, controlling, producing, and analyzing most aspects of commerce. Bar code readers 90 include laser scanners as well as other means of collecting product information, such as a bar code wand, still camera or area imager 92. In addition to bar code labels, other ADC data formats include Radio Frequency ("RF") tags, magnetic strips, Optical Character Recognition ("OCR"), speech input, and any symbol having encoded data therein.

Figure 8:
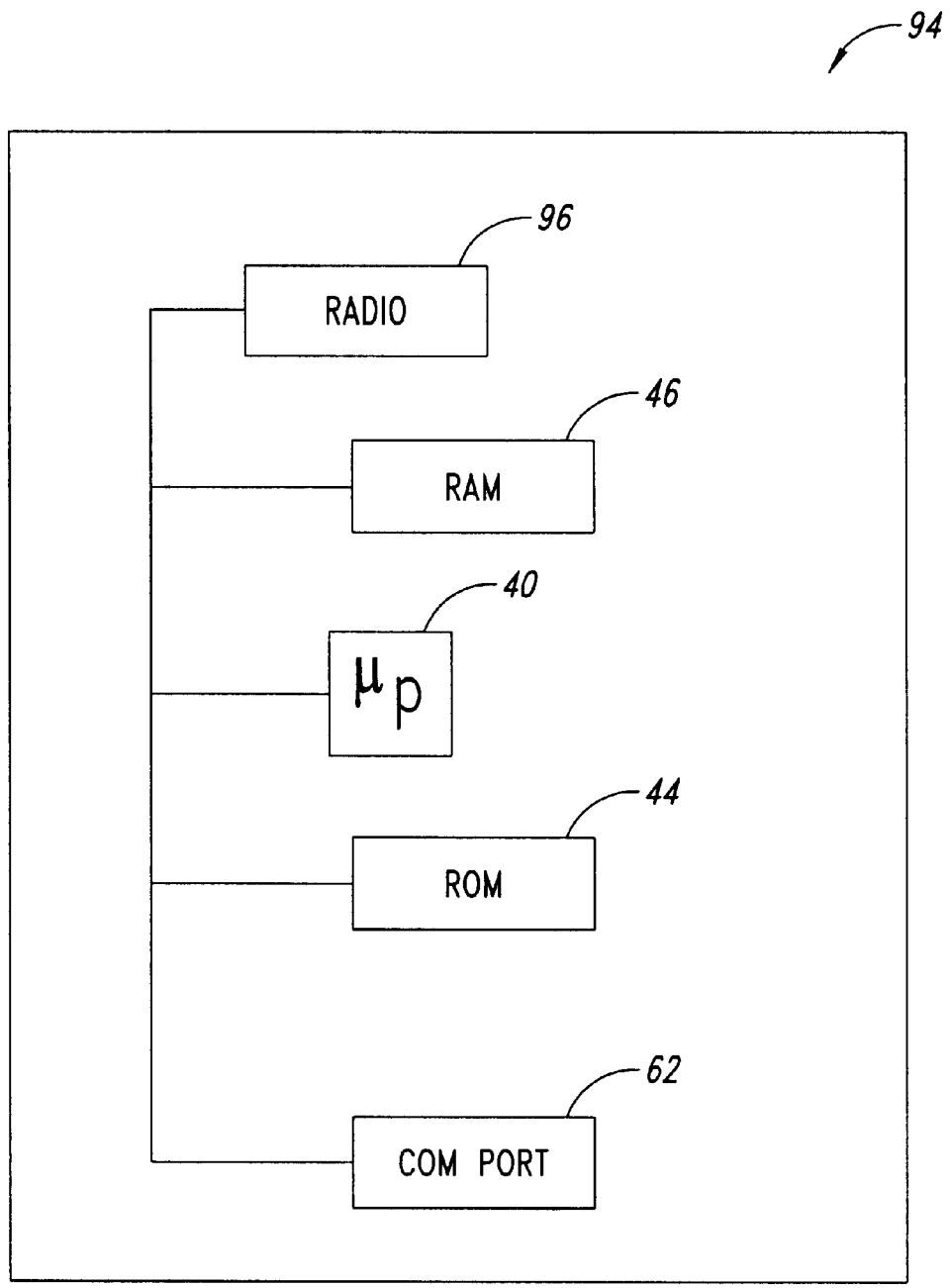
FIG. 8 is a functional block diagram of an automatic data collection device in the form of an RFID tag reader such as an interrogator.

Thus, the ADC devices may include, for example, bar code readers 90 (FIG. 7), radio frequency ("RF") tag readers 94 (FIG. 8), SmartCard readers, magnetic stripe readers, optical character recognition ("OCR") readers, speech input recognition devices, and all forms of scanning or imaging devices. An exemplary RF tag reader suitable for use in the ADC device platform is described in U.S. application Ser. No. 08/771,320, entitled, "Automatic Mode Detection and Conversion System for Printers and Tag Interrogators," filed on Apr. 27, 1998 and assigned to a common assignee.

Reader commands may be received from bar code devices, 900 MHz devices 96 (FIG. 8), and local or remote clients. Protocols can include a Proxim Open Air Radio MIB, a Scorpion 900 MHz Radio MIB, and a 802.11 MIB ("IEEE P802.11"), and other protocols, especially RF readable tag protocols.

Although specific embodiments of, and examples for, the invention are described herein for illustrative purposes, various equivalent modifications can be made without departing from the spirit and scope of the invention, as will be recognized by those skilled in the relevant art. The teachings provided herein of the invention can be applied to any processor controlled device, not necessarily the exemplary printer generally described above. For example, the teachings may apply to any computer peripheral device, such as a scanner, disk drive, CD_ROM drive, tape drive, or modem, whether or not the peripheral device includes a resident processor, or relies on a processor resident in an associated computer.

Similarly, the teachings may be applied to other devices not traditionally associated with a computer, such as a television, a VCR, a washing machine or dryer, and other home and commercial appliances and equipment. Thus, for example, a VCR may be upgrade to record in a format other than VHS, or to reconfigure a control panel or GUI for programming the VCR. The VCR may thereby be kept up-to-date with changing standards.

The system may also employ a host other than the server 28. For example, one of the personal computers 12, 14 or the server 20 may serve as the host, or the host may be a dedicated computer (not shown) that is coupled to the network or Internet through the server 20, 28.

Thus, the method and apparatus permits traditionally dedicated or "embedded" devices to be actively reconfigured and/or upgraded according the desires of the user. The method and apparatus further permit a device to function using a limited amount of ROM. Further, the method and apparatus automatically provide the device with the most recent software that is compatible with the various hardware components, user selected options and ownership information. Additionally, the method and apparatus permit a technician to download diagnostic programs to the device and to troubleshoot and repair the device from a remote location. Thus a modularized, easily and automatically upgradable and repairable device is provided.

These and other changes can be made to the invention in light of the above detailed description. In general, in the following claims, the terms used should not be construed to limit the invention to the specific embodiments disclosed in the specification and the claims, but should be construed to include all microprocessor controlled devices that operate in accordance with the claims. Accordingly, the invention is not limited by the disclosure, but instead its scope is to be determined entirely by the following claims.

We claim:

1. A method of configuring a printer comprising:
   initializing a volatile memory;
   executing a communications kernel resident in the printer;
   downloading a setup kernel to the memory in the printer;
   executing the setup kernel to determine at least one operational characteristic of the printer; and
   selectively linking a number of library modules of executable instructions based on the determined operational characteristic of the printer.

2. The method of claim 1 wherein executing the setup kernel to determine at least one operational characteristic includes checking a set of hardware characteristics of the printer.

3. The method of claim 1 wherein executing the setup kernel to determine at least one operational characteristic includes checking a set of printer hardware characteristics including a printhead type.

4. The method of claim 1 wherein executing the setup kernel to determine at least one operational characteristic includes checking a set of printer hardware characteristics including a transport mechanism type.

5. The method of claim 1 wherein executing the setup kernel to determine at least one operational characteristic includes checking a set of user selectable setup options.

6. The method of claim 1 wherein executing the setup kernel to determine at least one operational characteristic includes checking a set of user selectable setup options including a page size.

7. The method of claim 1 wherein executing the setup kernel to determine at least one operational characteristic includes checking a set of ownership attributes.

8. The method of claim 1 wherein executing the setup kernel to determine at least one operational characteristic includes checking a set of ownership attributes corresponding to at least one font.

9. The method of claim 1 wherein downloading a setup kernel to the volatile memory in the printer includes receiving the setup kernel over a network.

10. The method of claim 1 wherein downloading a setup kernel to the volatile memory in the printer includes receiving the setup kernel over the Internet.

11. The method of claim 1 wherein selectively linking a number of library modules comprises linking at least one module resident in the printer and at least one module not resident in the printer.

12. The method of claim 1, further comprising:
calculating a check sum value from the downloaded setup kernel; and
verifying the downloaded setup kernel with the check sum prior to executing the setup kernel.

13. The method of claim 1 wherein executing the setup kernel to determine at least one operational characteristic includes checking a set of ownership attributes corresponding to at least one font, and selectively linking a number of library modules comprises linking a print driver with at least one font module based on the ownership attributes.

14. The method of claim 1 wherein executing the setup kernel to determine at least one operational characteristic includes checking a set of ownership attributes corresponding to at least one font, and selectively linking a number of library modules comprises linking a print driver resident on the printer with at least one font module not resident on the printer via the Internet based on the ownership attributes.

15. A method of operating a processor controlled device, comprising:
executing a first kernel of instructions stored in a memory of the device to monitor a communications port of the device;
executing a second kernel of instructions to interrogate the operational characteristics of the device; and
linking a number of library modules of executable instructions based on a results of the interrogation to create a dynamic set of executable operating instructions for the device.

16. The method of claim 15, further comprising:
downloading the second kernel to the device.

17. The method of claim 15, further comprising:
downloading the second kernel to the device over the Internet.

18. The method of claim 15 wherein linking a number of library modules comprises linking at least two library modules downloaded from a network and resident in the device.

19. The method of claim 15 wherein linking a number of library modules comprises linking at least one library module resident in the device and at least one library module is not resident in the device.

20. The method of claim 15 wherein linking a number of library modules comprises linking at least one library module resident in the device and at least one library module resident in a computer coupled to the device.

21. The method of claim 15 wherein executing a second kernel of instructions to interrogate the operational characteristics of the device comprises interrogating a set of hardware characteristics of the device.

22. The method of claim 15 wherein the device is a printer and executing a second kernel of instructions to interrogate the operational characteristics of the device comprises interrogating a set of hardware characteristics of the printer including the resolution of a printhead.

23. The method of claim 15 wherein executing a second kernel of instructions to interrogate the operational characteristics of the device comprises interrogating a set of user defined options of the device.

24. The method of claim 15 wherein executing a second kernel of instructions to interrogate the operational characteristics of the device comprises interrogating a set of ownership attributes for at least one of the number of library modules.

25. The method of claim 15 wherein the device is a printer and executing a second kernel of instructions to interrogate the operational characteristics of the device comprises interrogating a set of ownership attributes for at least one of the number of library modules including a font library module.

26. The method of claim 15 wherein the device is a printer and executing a second kernel of instructions to interrogate the operational characteristics of the device comprises interrogating a set of ownership attributes resident on the device.

27. The method of claim 15 wherein the device is a printer and executing a second kernel of instructions to interrogate the operational characteristics of the device comprises interrogating a set of non-resident ownership attributes.

28. The method of claim 15, further comprising:
monitoring the operational characteristics of the device; and
dynamically relinking the library modules based on the operational characteristics of the device.

29. The method of claim 15, further comprising:
monitoring the operational characteristics of the device; and
dynamically relinking the library modules based on a current condition of a set of user defined options of the device.

30. The method of claim 15, further comprising:
monitoring the operational characteristics of the device; and
dynamically relinking the library modules based on a current condition of a set of ownership attributes of the device.

31. The method of claim 15, further comprising:
calculating a check sum value from the second kernel; and
verifying the second kernel with the check sum prior to executing the second kernel.

32. A method of configuring a printer over a network, comprising:
executing a communications kernel stored in a memory in the printer, the first kernel consisting of instructions for monitoring a communications port in the printer;
receiving a setup kernel over the network at the communications port in the printer;
executing the setup kernel to determine at least one operational characteristic of the printer; and
linking a number of library modules of executable instructions based on the operational characteristic of the printer.

33. The method of claim 32 wherein executing the setup kernel to determine at least one operational characteristic of the printer comprises determining a hardware configuration of the printer.

34. The method of claim 32 wherein executing the setup kernel to determine at least one operational characteristic of the printer comprises determining a hardware configuration of the printer including determining a printhead type.

35. The method of claim 32 wherein executing the setup kernel to determine at least one operational characteristic of the printer comprises determining a hardware configuration of the printer including determining a transport mechanism type.

36. The method of claim 32 wherein executing the setup kernel to determine at least one operational characteristic of the printer comprises determining a hardware configuration of the printer including determining a raster image processor type.

37. The method of claim 32 wherein executing the setup kernel to determine at least one operational characteristic of the printer comprises determining user selectable options for the printer.

38. The method of claim 32 wherein executing the setup kernel to determine at least one operational characteristic of the printer comprises determining user selectable options for the printer including determining a page size.

39. The method of claim 32 wherein executing the setup kernel to determine at least one operational characteristic of the printer comprises determining ownership attribute information for the printer.

40. The method of claim 32 wherein executing the setup kernel to determine at least one operational characteristic of the printer comprises determining ownership attribute information for the printer including determining an availability of a font for the printer.

41. The method of claim 32 wherein executing the setup kernel to determine at least one operational characteristic of the printer comprises determining ownership attribute information for the printer including determining an availability of a print driver for the printer.

42. The method of claim 32, further comprising:
monitoring the operational characteristics of the printer; and
dynamically linking different ones of the number of library modules based on the operational characteristics.

43. The method of claim 32, further comprising:
calculating a check sum value from the received setup kernel; and
verifying the received setup kernel using the check sum prior to executing the setup kernel.

44. The method of claim 32, further comprising:
linking the printer to a configuration homepage over the Worldwide Web.

45. The method of claim 32, further comprising:
linking the printer to a configuration homepage over the Worldwide Web wherein the setup kernel is embedded in the configuration homepage.

46. The method of claim 32, further comprising:
linking the printer to a configuration homepage including a setup options menu; and
displaying the setup options menu at the printer.

47. The method of claim 32, further comprising:
linking the printer to a configuration homepage including a setup options menu;
displaying the setup options menu at the printer; and
downloading a page format to the printer in response to selections from the setup options menu.

48. A printer comprising:
a printhead;
a communications port; and
a processor controlling the printhead, the processor executing:
a communications kernel at a first time;
a setup kernel at a second time, following the first time; and
a linked library of executable modules at a third time, following the second time.

49. The printer of claim 48 wherein the communications kernel comprises a set of executable instructions to control the communications port of the printer.

50. The printer of claim 48 wherein the setup kernel comprises a set of executable instructions to determine at least one operational characteristic of the printer.

51. A printer comprising:
a printhead;
a communications port;
a processor controlling the printhead; and
a memory coupled to the processor to provide executable instructions thereto, the memory storing:
a communications kernel at a first time;
a setup kernel at a second time, following the first time; and
at least one module of a linked library of executable modules at a third time, following the second time.

52. The printer of claim 51 wherein the communications kernel comprises a set of executable instructions to control the communications port of the printer.

53. The printer of claim 51 wherein the setup kernel comprises a set of executable instructions to determine at least one operational characteristic of the printer.

54. A method of configuring an automatic data collection device, comprising:
initializing a volatile memory;
executing a communications kernel resident in the automatic data collection device;
downloading a setup kernel to the memory of the automatic data collection device;
executing the setup kernel to determine at least one operational characteristic of the automatic data collection device; and
selectively linking a number of library modules of executable instructions based on the determined operational characteristic of the automatic data collection device.

55. The method of claim 54 wherein executing the setup kernel to determine at least one operational characteristic of the automatic data collection device includes checking a set of hardware characteristics of the automatic data collection device.

56. A method of operating a processor controlled automatic data collection device, comprising:
executing a first kernel of instructions stored in a memory of the automatic data collection device to monitor a communications port of the automatic data collection device;
executing a second kernel of instructions to interrogate the operational characteristics of the automatic data collection device; and
linking a number of library modules of executable instructions based on a results of the interrogation to create a dynamic set of executable operating instructions for the automatic data collection device.

57. A method of operating a processor controlled automatic data collection device wherein the automatic data collection device is a symbol reader, comprising:
executing a first kernel of instructions stored in a memory of the automatic data collection device to monitor a communications port of the automatic data collection device;
executing a second kernel of instructions to interrogate the operational characteristics of the automatic data collection device wherein executing the second kernel of instructions to interrogate the operational characteristics of the automatic data collection device includes interrogating a set of hardware characteristics of the symbol reader including an operating characteristic of an imager in the symbol reader; and
linking a number of library modules of executable instructions based on a results of the interrogation to create a dynamic set of executable operating instructions for the automatic data collection device.

58. A method of operating a processor controlled automatic data collection device wherein the automatic data collection device is an RFID tag reader, comprising:

executing a first kernel of instructions stored in a memory of the automatic data collection device to monitor a communications port of the automatic data collection device;

executing a second kernel of instructions to interrogate the operational characteristics of the automatic data collection device wherein executing the second kernel of instructions to interrogate the operational characteristics of the automatic data collection device includes interrogating a set of hardware characteristics of the RFID tag reader including an operating characteristic of a radio in the RFID tag reader; and linking a number of library modules of executable instructions based on a results of the interrogation to create a dynamic set of executable operating instructions for the automatic data collection device.

59. A method of configuring an automatic data collection device over a network, comprising:

executing a communications kernel stored in a memory in the automatic data collection device, the first kernel consisting of instructions for monitoring a communications port in the automatic data collection device;

receiving a setup kernel over the network at the communications port in the automatic data collection device;

executing the setup kernel to determine at least one operational characteristic of the automatic data collection device; and linking a number of library modules of executable instructions based on the operational characteristic of the automatic data collection device.

60. The method of claim 59 wherein executing the setup kernel to determine at least one operational characteristic of the automatic data collection device includes determining an operating characteristic of an imager in the automatic data collection device.

61. A method of configuring an automatic data collection device over a network, comprising:

executing a communications kernel stored in a memory in the automatic data collection device, the first kernel consisting of instructions for monitoring a communications port in the automatic data collection device;

receiving a setup kernel over the network at the communications port in the automatic data collection device;

executing the setup kernel to determine at least one operational characteristic of the automatic data collection device wherein executing the setup kernel to determine at least one operational characteristic of the automatic data collection device includes determining an operating characteristic of a radio in the automatic data collection device; and linking a number of library modules of executable instructions based on the operational characteristic of the automatic data collection device.

62. An automatic data collection device, comprising:

an imager;

a communications port; and a processor controlling the imager, the processor executing:
   a communications kernel at a first time;
   a setup kernel at a second time, following the first time; and
   a linked library of executable modules at a third time, following the second time.

63. An automatic data collection device, comprising:

an RF interrogator;

a communications port; and a processor controlling the RF interrogator, the processor executing:
   a communications kernel at a first time;
   a setup kernel at a second time, following the first time; and
   a linked library of executable modules at a third time, following the second time.

* * * * *